United States Patent [19]
Offenberg

[11] Patent Number: 5,574,222
[45] Date of Patent: Nov. 12, 1996

[54] ACCELERATION SENSOR

[75] Inventor: Michael Offenberg, Tuebingen, Germany

[73] Assignee: Robert Bosch GmbH, Stuttgart, Germany

[21] Appl. No.: 511,184

[22] Filed: Aug. 4, 1995

[30]  Foreign Application Priority Data

Sep. 2, 1994 [DE] Germany ............................ 44 31 338.1

[51] Int. Cl.$^6$ ................................................. G01P 15/125
[52] U.S. Cl. ...................... 73/514.32; 361/283.3
[58] Field of Search ...................... 73/514.32; 361/283.3; 310/309; 324/725

[56]  References Cited

U.S. PATENT DOCUMENTS

| | | | |
|---|---|---|---|
| 4,177,421 | 12/1979 | Thornburg | 324/725 |
| 5,025,346 | 6/1991 | Tang et al. | 361/283 |
| 5,428,259 | 6/1995 | Suzuki | 310/309 |
| 5,447,068 | 9/1995 | Tang | 73/514.32 |

FOREIGN PATENT DOCUMENTS

| | | | |
|---|---|---|---|
| 2240178 | 7/1991 | United Kingdom | 73/514.32 |
| WO92/03740 | 3/1992 | WIPO . | |

Primary Examiner—Hezron E. Williams
Assistant Examiner—Richard A. Moller
Attorney, Agent, or Firm—Kenyon & Kenyon

[57]  ABSTRACT

In an acceleration sensor having a multiplicity of movable electrodes, a first group of fixed electrodes is arranged on one side of the movable electrodes and a second group of fixed electrodes is arranged on the other side of the movable electrodes. The fixed electrodes of the first group are suspended from a connecting beam and are connected in parallel electrically by the latter. The fixed electrodes of the second group are anchored individually on the substrate and are connected in parallel electrically by means of a connecting conductor track.

6 Claims, 1 Drawing Sheet

ACCELERATION SENSOR

BACKGROUND INFORMATION

International Application No. WO 92/03740 describes an acceleration sensor which is produced on a substrate by means of surface micromechanics. The sensor has a movable seismic mass which is suspended from a thin bending element in such a way that it can be displaced by an acceleration parallel to the surface or the substrate. Fastened to the seismic mass are movable electrodes which are arranged between fixed electrodes, the fixed electrodes being anchored on the substrate. Consequently, the distances between the movable electrodes and the fixed electrodes are varied by an acceleration, and this leads to a change in the capacitance between the electrodes. The evaluation of the change of this capacitance is then a measure of the acceleration.

The fixed electrodes have a first and a second group, the electrodes of the first group being arranged on one side of the movable electrodes, and the second group of fixed electrodes being arranged on the other side of the movable electrodes. The electrodes of the individual groups are respectively electrically connected in parallel. The fixed electrodes are respectively anchored individually on the substrate. The electrical contacting of the individual fixed electrodes is performed by conductor tracks which are diffused into the silicon substrate.

In such sensors, very small changes in capacitance have to be detected. Conductor tracks which are arranged in the immediate vicinity of one another have large stray capacitances. Furthermore, conductor tracks, in particular diffused conductor tracks, have a certain resistance value, which can impede the measurement of small capacitances. It is therefore desirable to use approximately the same resistance value for the conductor track for all fixed electrodes of a group.

SUMMARY OF THE INVENTION

The acceleration sensor according to the present invention has the advantage that the measurability of the capacitances of a sensor is facilitated. The sensor according to the present invention permits the conductor tracks to be brought up symmetrically to the fixed electrodes, as a result of which the measurability of the sensor signals is improved, since parasitic effects between the individual fixed electrodes are reduced. Furthermore, it is thus possible for the conductor tracks to be arranged at a large distance from one another, and this reduces the parasitic effects between the individual conductor tracks. Furthermore, the configuration, according to the present invention, of the sensor requires no additional space for the arrangement of the conductor tracks, with the result that the sensor can be built particularly small.

DETAILED DESCRIPTION

Figure 1:
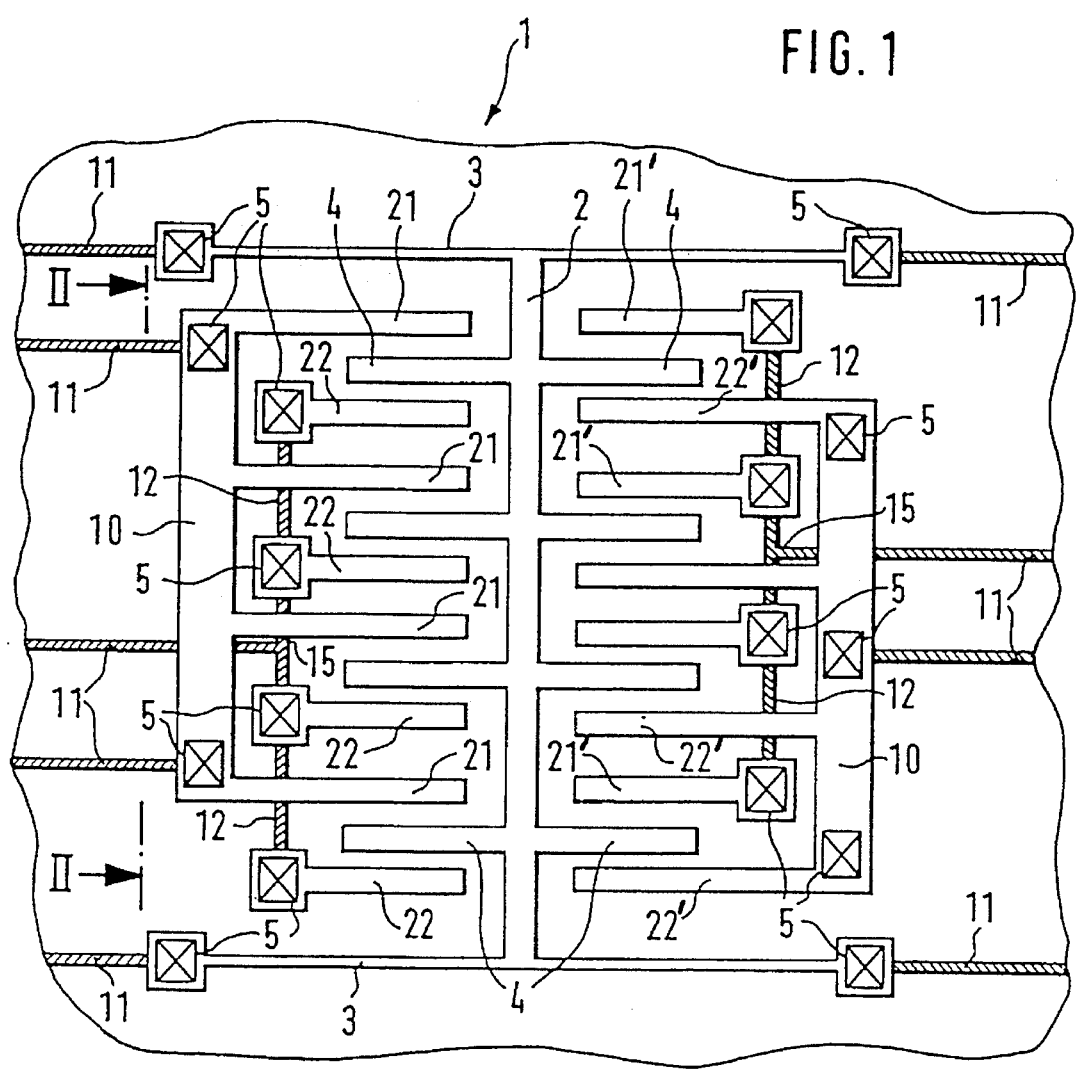
FIG. 1 shows a plan view of an acceleration sensor according to the present invention.

A plan view of a silicon substrate 1 having an acceleration sensor is shown in FIG. 1. At first, only the left-hand side of the sensor is considered. The sensor is formed of polysilicon. However, the sensor can also be formed of monocrystalline silicon or partially of polycrystalline and monocrystalline silicon. The acceleration sensor has a seismic mass 2 which is suspended by means of bending elements 3 in such a way that the seismic mass can be displaced by an acceleration parallel to the surface of the substrate 1. The bending elements 3 are anchored on the substrate by means of anchor points 5.

Suspended from the seismic mass 2 are movable electrodes 4 which can thus likewise be deflected by an acceleration. The movable electrodes 4 are arranged between fixed electrodes 21, 22. The fixed electrodes are divided into two groups. The first group of fixed electrodes 21 is arranged on one side of the movable electrodes 4 and the fixed electrodes 21 of the first group are electrically connected to one another. The second group of fixed electrodes 22 is arranged on the other side of the movable electrodes 4 and the fixed electrodes 22 of the second group are electrically connected to one another. The movable electrodes 4, with the fixed electrodes 21, 22, thus form plate capacitors in a so-called differential arrangement. This means that the capacitance between the movable electrodes 4 and the first group of fixed electrodes 21 is increased when the capacitance between the movable electrodes 4 and the second group of fixed electrodes 22 is reduced. Likewise, the capacitance between the second group 22 and the movable electrodes 4 is increased when the capacitance between the movable electrodes 4 and the first group 21 decreases.

On the right-hand side of the sensor, there are further provided a third electrode group 21' and a fourth electrode group 22'. However, these are not considered at first, but in describing the present invention it will first be assumed that the two sides of the sensor are mirror images of one another.

The anchor points 5 are not, of course, visible in a plan view of the sensor. However, they are represented here in order to facilitate an understanding of the points at which the sensor is anchored on the substrate 1.

The sensor according to FIG. 1 differs from that described in International Application No. WO 92/03740 in how the two groups of fixed electrodes 21, 22 are anchored on the substrate, and in how the electric signals are conducted from the electrodes to evaluation circuits. The first group of electrodes 21 is suspended from a connecting beam 10, which is then anchored on the substrate 1 via two or three anchor points 5. Of course, it is also possible to provide a multiplicity of anchor points 5, it being aimed, however, to exclude the connecting beam 10 from being anchored completely, that is to say with its entire surface, on the substrate. In the second group of fixed electrodes 22, each electrode 22 is respectively anchored individually on the substrate via a dedicated anchor point 5. Just like the first group of fixed electrodes 21, the connecting beam 10 includes appropriately doped polysilicon, and thus connects the individual fixed electrodes 21 of the first group in parallel with one another.

By feeding a conductor track 11 to at least one of the anchor points of the connecting beam 10, it is thus possible for a measurement signal to be tapped at all fixed electrodes 21 of the first group. The anchor points 5 of the fixed electrodes 22 of the second group are connected by means of the connecting conductor track 12. All the electrodes 22 of the second group are thus connected in parallel with one another by means of this connecting conductor track 12. By bringing up at least one conductor track 11 to the connecting conductor track 12, the signal of all the fixed electrodes 22 of the second group can thus be tapped.

Figure 2:
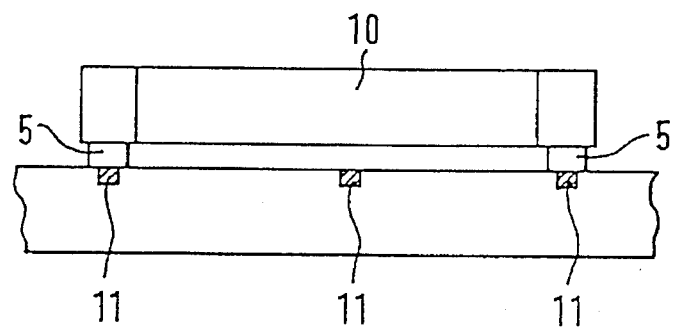
FIG. 2 shows a side view of the sensor and a cross-section through the substrate along the line II—II in FIG. 1.

Shown in FIG. 2 is a cross section through the semiconductor substrate 1, and a side view of the connecting beam 10 along the line II—II of FIG. 1. As can be seen, the conductor tracks 11 are diffused conductor tracks which are introduced into the silicon substrate 1. By bringing up such a diffused conductor track 11 to the anchor point 5 of the connecting beam 10, an electric contact is produced between the conductor tracks 11 and the connecting beam 10. Furthermore, it can be seen in the side view of FIG. 2 that the connecting beam 10 is connected to the substrate 1 only by means of anchor points 5. It is therefore possible to lead through under the connecting beam 10 a conductor track 11 which then contacts the connecting conductor track 12 of the second group of fixed electrodes 22. In order to keep the representation clear, the parts of the sensor situated behind the connecting beam 10 are not represented.

The diffused conductor tracks 11 have a residual resistance which is not negligible. The signals of the fixed electrodes 22, which are far removed from the connecting point 15 of the conductor track 11 with the connecting conductor track 12, are thus measured with a larger resistance than the signals of the fixed electrodes, which are arranged in the immediate vicinity of this connecting point. Since these resistances of the conductor tracks cannot be neglected, at least one symmetrical connection should be performed, since possible parasitic effects can then be minimized because of the symmetry. The connection of the conductor track 11 to the connecting beam 10 should likewise be performed as symmetrically as possible.

In FIG. 1, two different connecting concepts for a symmetrical connection are shown. On the left-hand side of the sensor, it is shown that the connecting beam 10 is connected by means of two conductor tracks 11, and a symmetrical design is thus achieved. On the right-hand side, it is shown for the fourth electrode group 22' that the connecting beam 10 is connected at its center, that is to say once again symmetrically relative to all the fixed electrodes 21, by a single conductor track 11.

Even though the connection of the connecting conductor track 12 is shown in FIG. 1 only by a central conductor track 11, it should be understood, of course, that it is also possible for a plurality of conductor tracks 11 to be connected to the connecting conductor track 12 if this is performed symmetrically.

Diffused conductor tracks in a semiconductor substrate form large parasitic capacitances which are connected in parallel with the useful capacitances of the sensors insofar as the lines are guided in the immediate vicinity of one another. If the fixed electrodes 21 were to be likewise connected in parallel with one another by means of a connecting conductor track, two connecting conductor tracks would extend in close proximity parallel to one another. Such an arrangement is bound up with a large cross-talk and a large mutual interference of the two conductor tracks. Since the conductor tracks 11 can be led at a large distance from one another for the purpose of connecting the connecting beam 10 and the connecting conductor track 12, the mutual influence between these two conductor tracks is slight. Since the connecting beam 10 is separated by an air gap from the conducting conductor track 12, these two elements also scarcely exert any influence on one another. The occurrence of parasitic effects between the two electrode groups 21, 22 is thus kept slight.

The conductor tracks are introduced into the silicon substrate by diffusion processes. Depending on the processes used for this purpose, the conductor tracks cannot be given arbitrarily narrow configurations. Again, it is frequently desirable for the purpose of introducing the conductor tracks to make use of processes which are already used for other steps in the production process, since in this way the total number of process steps is reduced. The conductor tracks 11 must therefore be at a certain distance from one another and from the anchor points 5. By using the connecting beam 10, the conductor tracks 11 can be arranged without difficulty at a sufficiently large distance, with the result that the space requirement of the sensor is reduced.

If both groups 21, 22 of fixed electrodes are to be connected to one another by means of connecting conductor tracks 12, it is necessary to provide a conductor track crossover at least one point between a conductor track 11 and a connecting conductor track 12, in order to achieve a symmetrical connection of the electrodes 21, 22. The space requirement of the sensor is also increased by such a measure. A further possibility could reside in not completely connecting the outer electrode group (the electrode group 21 in FIG. 1) to a connecting conductor track 12 but interrupting the connecting conductor track 12 at least one point so that at this point the conductor track 11 permits the connection of the inner electrode group (the electrode group 22 in FIG. 1). Since the conductor tracks 11 must, however, keep at a certain distance from the anchor points 5, it would be necessary to provide at this point a particularly large distance between the suspensions 5. This, too, is bound up with a larger space requirement for the sensor.

Because of the different geometrical configuration, the capacitances of the fixed electrodes differ depending on whether they are contacted with a connecting beam 10 or with a connecting conductor track 12. On the left-hand side of FIG. 1, the fixed electrodes 21 of the first group are connected by means of a connecting beam 10. On the right-hand side of FIG. 1, the fixed electrodes of the third group 21' are connected by means of a connecting conductor track 12. In a corresponding way, the electrodes of the second group 22 are connected to one another by means of connecting conductor tracks 12 and the electrodes of the fourth group 22' are connected to one another by means of a beam 10. It is achieved through these measures that when the electrodes of the first group 21 are interconnected with the electrodes of the third group 21' and those of the second group 22 are interconnected with those of the fourth group 22', the resulting total capacitance is the same. The symmetry of the differential capacitor arrangement is thus improved by means of these measures, and the measurability of the sensor signal is facilitated.

What is claimed is:

1. An acceleration sensor comprising:

a substrate;

a bending element mounted to the substrate;

a seismic mass suspended from the bending element;

a plurality of movable electrodes suspended from the seismic mass and adapted to move with respect to the substrate in response to an acceleration;

a connecting beam mounted on the substrate;

a first group of fixed electrodes suspended from the connecting beam, the first group including a plurality of fixed electrodes, each of the fixed electrodes of the first group arranged on one side of a respective one of the movable electrodes; and a second group of fixed electrodes, each of the fixed electrodes of the second group individually mounted on the substrate and arranged on another side of the respective movable electrode opposite the side of the respective movable electrode on which a respective fixed electrode of the first group is arranged;

wherein the first and second groups of fixed electrodes and the movable electrodes form at least one plate capacitor.

2. The acceleration sensor according to claim 1, wherein each of the movable electrodes is between one of the first group of fixed electrodes and one of the second group of fixed electrodes, thereby forming one of the at least one plate capacitor.

3. The acceleration sensor according to claim 2, wherein a quantity of plate capacitors corresponds to a quantity of each of the movable electrodes, first group of fixed electrodes, and second group of fixed electrodes.

4. The acceleration sensor according to claim 1, further comprising a connecting conductor track electrically coupling the second group of fixed electrodes in parallel, and wherein the first group of fixed electrodes are electrically coupled in parallel by the connecting beam.

5. The acceleration sensor according to claim 4, further comprising at least one conductor track for connecting the connecting beam and the connecting conductor track.

6. The acceleration sensor according to claim 5, wherein the connection of the connecting beam and the connecting conductor track is symmetrical relative to the first and second groups of fixed electrodes.

* * * * *